(12) United States Patent
Schwerdtfeger

(10) Patent No.: US 11,521,383 B2
(45) Date of Patent: Dec. 6, 2022

(54) MIXED REALITY SIMULATOR FOR PROFESSIONAL TRAINING

(71) Applicant: Björn Schwerdtfeger, Munich (DE)

(72) Inventor: Björn Schwerdtfeger, Munich (DE)

(73) Assignee: Björn Schwerdtfeger, Munich (DE)

( * ) Notice: Subject to any disclaimer, the term of this patent is extended or adjusted under 35 U.S.C. 154(b) by 349 days.

(21) Appl. No.: 16/754,957

(22) PCT Filed: Oct. 9, 2018

(86) PCT No.: PCT/EP2018/077482
§ 371 (c)(1),
(2) Date: Apr. 9, 2020

(87) PCT Pub. No.: WO2019/072850
PCT Pub. Date: Apr. 18, 2019

(65) Prior Publication Data
US 2020/0234049 A1    Jul. 23, 2020

(30) Foreign Application Priority Data
Oct. 9, 2017    (EP) ..................................... 17195563

(51) Int. Cl.
*G06V 20/20*    (2022.01)
*G06F 3/01*    (2006.01)
*G06N 20/00*    (2019.01)
*G06T 19/00*    (2011.01)
*G09B 19/00*    (2006.01)

(52) U.S. Cl.
CPC .............. *G06V 20/20* (2022.01); *G06F 3/011* (2013.01); *G06N 20/00* (2019.01); *G06T 19/006* (2013.01); *G09B 19/00* (2013.01)

(58) Field of Classification Search
CPC ........ G06V 20/20; G06F 3/011; G06N 20/00; G06T 19/006; G09B 19/00
See application file for complete search history.

(56) References Cited

U.S. PATENT DOCUMENTS

| | | | |
|---|---|---|---|
| 10,261,685 B2* | 4/2019 | Deselaers | G06F 3/04883 |
| 2013/0342564 A1* | 12/2013 | Kinnebrew | G09G 3/003 |
| | | | 345/619 |
| 2017/0177386 A1* | 6/2017 | Fung | G06F 3/0482 |
| 2017/0213473 A1* | 7/2017 | Ribeira | G06T 13/40 |

* cited by examiner

*Primary Examiner* — Tapas Mazumder
(74) *Attorney, Agent, or Firm* — Taft Stettinius & Hollister LLP; Ryan O. White; Derek B. Lavender

(57) ABSTRACT

The present disclosure relates to computer-based training utilizing simulation, and more specifically to mixed and augmented reality simulation software for professional training purposes, including but not limited to mechanical training.

14 Claims, 1 Drawing Sheet

MIXED REALITY SIMULATOR FOR PROFESSIONAL TRAINING

Figure 1A:
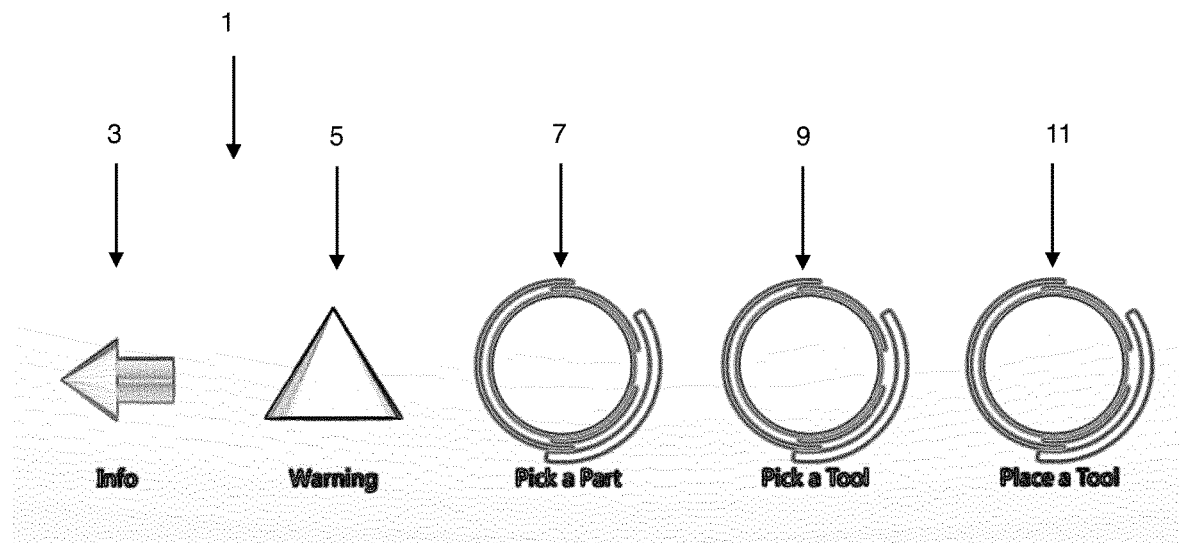

This application is a U.S. National Phase of International PCT Application No. PCT/EP2018/077482 filed on Oct. 9, 2018, which claims priority to EP Application No. 17195563.6 filed on Oct. 9, 2017, the contents of each application are herein incorporated by reference in their entirety.

The present disclosure relates to computer-based training utilizing simulation, and more specifically to mixed, augmented and virtual reality simulation software for professional training purposes, including but not limited to mechanical training.

Within a mixed-reality environment, a user can interactive with synthetic actors and virtual objects (hereafter collectively referred to as "virtual objects"). The term "virtual object" is intended to include, but is not limited to, any object that can be rendered on a display. The term "mixed-reality environment" is intended to include, but is not limited to, a visual domain wherein a real world user can interact with virtual objects integrated into a user's view of the real world.

Techniques are described herein that provide for systems, methods, and non-transitory computer-readable media for simulation based training. This methodology uses augmented reality, which shall as well be used as a term for mixed reality or virtual reality subsequently, a particular incarnation of virtual reality, in order to greatly advance the degree of equipment fidelity, environment fidelity, and psychological fidelity available in simulation for training, with certain embodiments also decreasing the cost and improving portability of simulation systems, depending on the particular hardware utilized to realize the simulation system.

Here, an augmented reality or mixed reality environment refers to the perception of a user of their real, physical environment with the addition of virtual, projected, two or three dimensional objects in that environment. Integral to the concept of an augmented reality or mixed reality environment is the feature of the virtual objects to be perceived to exist in the real space as if they were real objects, with the ability of users to walk around them and see them from different angles, as appropriate. In harnessing this for training, the method described enables a replication of nearly an infinite number of environments.

Processes are later described herein for establishing an augmented reality environment, utilizing a computer application to author simulation scenario cases, processing actions on virtual objects, and recording the events transpiring while users are immersed in the augmented reality environment. Such processes are at present costly and time consuming and one objective of the present application is to overcome said problem.

Such scenario cases may be comprised of instruction sets and associated metadata and subordinate instruction sets and data, such as audio data or image data, and may be distributed locally or broadly through the use of an internet infrastructure, marketplace, or other distribution mechanism. In particular scenario cases for training of employees could be distributed within a complete company easily after being established once.

Establishing an augmented reality environment within a real space refers to using computer generated virtual models, or virtual objects, projected into the space, where the virtual objects behave as if they are physically in the space, and where multiple users can see each other, or at least placeholders of each other, and the virtual objects, and interact with the virtual objects and each other, mimicking a situation where all virtual objects and users are physically in the real space and are solid objects or beings, even in the scenario where the user themselves are not in the same real space.

Virtual objects may be projected into empty physical locations or they may be projected over existing real objects and partially or fully obstruct the actual view of the real object while allowing for physical interactions, such as touch, with the real object, and allowing for such interactions to be detected and the virtual object updated based on the interaction.

Utilizing a computer application to author scenario cases refers to the use of an authoring application which outputs an instruction set that defines the appearance, properties, and behaviour of virtual objects in an augmented reality environment with respect to time, as well as defining virtual objects effects on other objects in the augmented reality and the effect of other objects on the virtual object.

Such authoring applications are quite complicated to use nowadays. Mostly the same could only be used with individual programming skills and they could not be used by technicians or employees of companies themselves to set up training scenarios.

Therefore, one objection of the present disclosure is to ease the authoring of scenario cases, in particular for training scenarios, using augmented or mixed-reality environments. In particular one objective of the present disclosure is that no programming skills are needed to author a scenario case in such an environment.

The present objective is solved by a method comprising establishing, using at least one computing device, an augmented reality environment;
wherein the augmented reality environment is comprised of a real space in which a user is physically located;
wherein the augmented reality environment comprises a set of virtual objects projected into the real space assignable to physical objects by the user;
sensing, by at least one sensor, a particular physical action of the user in the real space in which the user is physically located representative for the assignment of the virtual object to the physical object;
in response to sensing the particular physical action in the real space in which the user is physically located, updating, by at least one application executing on the at least one computing device, a set of one or more properties of a list linking the physical and the virtual objects based on the particular physical action sensed by the at least one sensor, and wherein updating the set of one or more properties of the list linking the physical and the virtual objects based on the particular physical action sensed by the at least one sensor causes a subsequent user to see in the established augmented reality the virtual objects assigned to the physical objects by the user.

Thereby, it may be preferred that updating the set of one or more properties of the list linking the physical and the virtual objects based on the particular physical action sensed by the at least one sensor causes subsequent users to see the virtual objects assigned to the physical objects.

The subsequent user is the first user interacting with the augmented reality environment after having assigned at least one virtual object to the physical object comprising the updated list and/or a new user not identical with the first user.

The surprising finding of the present invention is that the authoring of scenario cases, in particular of training scenarios, could be eased significantly by setting the same up in the augmented reality environment directly itself instead of programming the same in advanced. This makes it possible for everyone to set up scenario cases, even without any programming skills.

To do so, it is according to one embodiment of the present disclosure possible that a user assigns virtual objects to physical objects by physical actions. The set of virtual objects may comprise functional elements, in particular visualizations and/or symbols for physical actions, preferably visualizations and/or symbols for take, use, place and/or store a physical object, assembly positions, assembly pathways, different types of warnings, tools to be used, general information, preferably a turning moment, inspection tasks and/or how to click a clip.

It may as well be possible that videos are recorded of movements and action of the first user upon request of the first user by the computing device and assigned to a certain physical object. The video itself may be a three-dimensional video or a three-dimensional visualization of the recorded scene generated from the computing device with the help of software known in the state of the art automatically or upon request of the first user.

It may be possible that this video is shown afterwards as a further help to the subsequent user and therefore being part of the training scenarios.

To link said virtual objects to real physical objects makes it quite simple to create a training scenario. The user is enable by the method according to the present disclosure to make a physical movement to assign for example a "take" symbol to a certain tool. Afterwards, the "use" symbol is placed above, next to or directly at the physical object the grabbed tool should be used. Such steps could easily be completed by instructions and warnings as well as general information which all can be linked with physical objects just by a physical movement of the user only.

It may be in particular of advantage that the training scenarios are created directly in the workshops, factory halls or the like and therefore directly at the places where the users to be trained will work later on. It is therefore possible to directly integrate the training scenarios into the real working environment of the users.

Thereby, it can be of advantage according to one embodiment of the present disclosure that the list linking the physical and the virtual objects based on the particular physical action is generated in the order the physical actions are performed by the user and shown in said order to the subsequent users.

By sensing the order of the physical actions performed by the first user, each subsequent user will work within the established training scenario along that list and the system will show the same step by step functional elements representative for general information and/or for actions to be performed.

It is of course possible that the order of said list is re-arranged and changed later on freely.

One aspect of the present disclosure is thereby that the authoring of scenario cases is as easy as possible. Example given, a first user wants to explain how to assemble a fuel tank to subsequent users. The first user activates the augmented reality environment and points to a virtual object e.g. "take". By moving for example the "take" symbol over the fuel tank, the list is updated and the subsequent users will directly see in the augmented reality environment that he has to take the fuel tank.

The next step could for example be a "walk" instruction to a certain location so that it is clear for the subsequent user that he should take the fuel tank and walk to said location.

It is obvious that this example is not limiting the scope of the present application, there are several alternative known and disclosed in the present application how to assign a virtual object to a physical object. This very simple example shall only ease the understanding of the further explanations below.

According to one embodiment of the present disclosure, the particular physical action by the at least one user is comprised of at least one body movement, direct input of data into the at least one computer device, at least one vocalization, or the expression of specific ideas via body movement or vocalization.

Thereby, the at least one body movement comprises hand movements, viewing at positions, eyetracking and/or the use of interaction devices, in particular the use of a joystick or a controller.

It may thereby be preferred that the particular physical actions comprise a predefined component to be executed by the user to indicate the system to assign a virtual object to a physical object. In the alternative, the particular physical actions to assign a virtual object to a physical object is determined by the at least one computing device automatically, and preferably no predefined movement of the user is needed, in particular wherein the assignment of the virtual to the physical object is determined by the at least one computing device by machine learning and/or artificial intelligence.

Machine learning generally includes the construction or generation of machine learning algorithms that can learn from data. These algorithms are used to build a model based on features that is used to generate a classifier tuned to a particular purpose. Active machine learning is a discipline where a "teacher," such as a user, presents training examples to train a function to the model.

Historically, whether training examples were labeled or unlabeled has been based on the particular purpose. For example, in existing systems training examples for implementing a classifier tuned to classify documents about the subject of baseball typically include examples of documents labeled as relating to baseball and examples of documents labeled as not relating to baseball.

Other existing training examples were unlabeled. For example, unlabeled examples might or might not have been related to baseball. Accordingly, a third party such as the teacher must label existing unlabeled training examples so that the model has valuable input by which to learn an associated function.

In particular, active learning necessitates relatively high-quality labeled training examples such that the model can adequately learn the desired function for future classification of any number of unlabeled input documents. However, the discovery of high-quality labeled training examples amongst the virtually unlimited number of unlabeled documents available to the machine learning algorithm is typically costly. For example, many users are employed to interpret unlabeled documents to determine viability for machine learning purposes. However, if a particular model being trained by existing machine learning algorithms needs to be limited, the viability of each potential candidate for a labeled training example must be even more carefully considered, and costs can exceed desired targets.

Machine learning in the sense of the present disclosure may be preferably active machine learning. For example, the first user makes a specific body movement and the system learns what is meant by this body movement with the help of an active feedback of the first user.

The method according to the present disclosure allows several options to link virtual and physical objects to generate scenario cases. One is that the system just "learns" automatically what to do. This means that the system sense and recognized the actions made by the user and the objects used by the user and captures the same for showing the same to the next user. This is of advantage to make quick and fast training scenarios without any further interaction with the system. Addition information like manuals, general information and warnings could be added later.

The other possibility according to the present disclosure is that a certain physical action has to be performed by the user for the linking of objects. In particular, it is of advantage according to one embodiment of the present disclosure that the virtual objects are displayed to a user and could be selected for example with the help of eyetracking and/or a controller. It is of course as well that virtual objects are selected via body movement or vocalization or a combination thereof.

For example it is possible that a user points to a virtual objects, keeps the finger on it an places at or next to the desired physical object. By this, both objects are linked. As well, it could be possible that the user "talks" with the system by using a special key word as the starting word for communication and directs the system by speech.

As well, to optimize the training scenarios and/or to make audits it is preferred according to one embodiment that updating the set of one or more properties of the list linking the physical and the virtual objects based on the particular physical action sensed by the at least one sensor causes the comparing of the sensed physical actions of a subsequent user with the predetermined actions defined by the assigned virtual objects, wherein similarities and differences are sensed by the at least one sensor and compared by the at least one computing device.

Thereby it may be of advantage that the level of detailing of the virtual objects assigned to the physical objects shown to a subsequent user depends on a level of experience of the subsequent user, in particular determined by the monitored similarities and differences of executed actions and predetermined actions defined by the assigned virtual objects.

In the first step, a first user authors a training scenario. There is no need that all information comprised by said training scenario have been shown to every subsequent user at any time. Maybe after several reviews a subsequent user knows what to do, or for audit reasons is may be of help to record and compare the skills of a subsequent user by just comparing the actions with the actions that are predefined with the help of the virtual objects without showing the virtual objects at all.

As well it is according to one embodiment of advantage that the user views the augmented reality environment by wearing at least one apparatus that projects virtual objects into the real space in which the user is physically located; wherein the at least one apparatus includes the at least one sensor, at least one display, through which projections of the virtual objects are viewed, and at least one processor.

Thereby, it may be preferred that the at least one apparatus worn by the user allows for binocular or monocular vision to immerses the user within the augmented reality environment.

In particular, it could be preferred that the at least one sensor includes at least one of a digital video camera, an electromagnetic sensor, an accelerometer, or a gravimeter.

The user-worn apparatus may be comprised of one or more video sensors (e.g. video cameras) and/or a LIDAR system, an Inertial Measurement Unit (IMU), a Global Positioning System (GPS) sensor, a computer processor, and a see-through MID (Head mounted display) or eyewear. A see-through HMD may be any medium configured to render an object while still allowing a user to see through the medium at any location where an object is not being rendered and view the user's real life environment. The one or more video cameras, IMU, and GPS sensor may generate a data set used by the computer processor to calculate a pose estimation data set, wherein the pose estimation data set may determine the pose and location of a user, a user's head, and a user-controlled device. This pose estimation data set enables the user-worn sub-system to appropriately position and occlude synthetic objects in a user's field of view, thereby accurately integrating the synthetic objects into the augmented reality environment.

As well it may be of advantage according to one embodiment of the present disclosure that each virtual object can be assigned to an individual work area having local coordinate space, wherein each individual work area is assigned with a trackable marker, wherein the trackable marker allows the computing devices to identify each individual work area independent from their actual location in the real space by updating the local coordinate space accordingly.

By using a trackable marker, it is possible e.g. to uniquely identify a shelf. The shelf itself could be seen as one certain work area and there may be virtual objects assigned to physical objects in said shelf. As one example, a shelf may comprise several storage boxes. If a user links the virtual object "take" to one of said boxes, the subsequent user will take said object. If the shelf is moved and a different shelf is located at this position, the subsequent user would grab the wrong tool. According to the present disclosure this problem is solved by the work areas.

The work areas help in particular to define several different types of locations, like a "tool area" where tools are stored, a general "storage area" for spare parts, a "repair area" or a "assembly area". These areas are useful and could as well be pre-defined before the user is setting up the training scenario. Of course it is as well possible that the user defines said areas himself freely by authoring the scenario.

Said work areas are independent of their physical location, but only virtually linked by the trackable markers. Thereby it may be preferred that the marker is a data tag, preferably a visual target, in particular a two dimensional or three dimensional barcode, a NFC-Tag and/or a RFID-Tag and/or the marker is an unique identifiable physical object sensed by the at least one data unit and linked with the virtual object in the list of objects.

With the help of defining work areas in addition to the linking of physical and virtual objects possible unintended failures in use could be minimized.

Figure 1B:
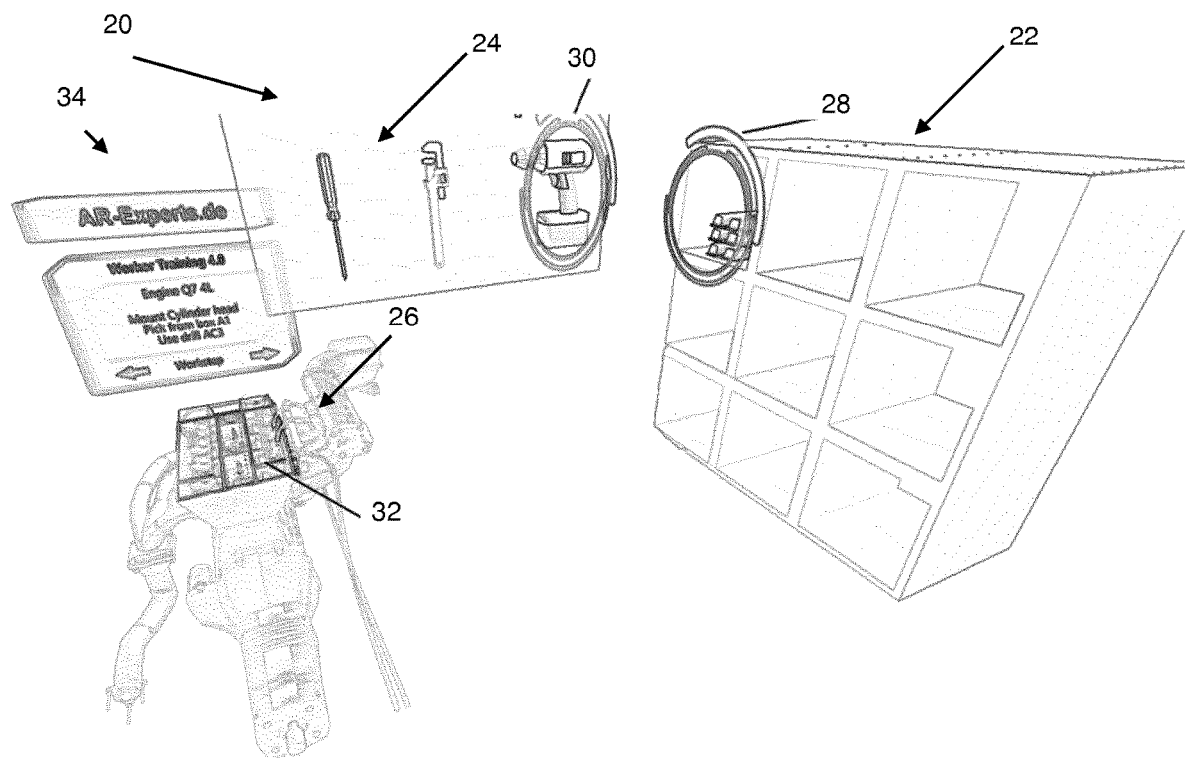

The foregoing aspects and many of the attendant advantages of this invention will become more readily appreciated as the same become better understood by reference to the following detailed description, when taken in conjunction with the accompanying drawing, wherein:

FIG. 1a shows an example of virtual objects displayed to a user for assignment with physical objects; and FIG. 1b shows a shematic threedimensional view of a visualisation of one embodiment of a method according to the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

While illustrative examples are illustrated and described below, it will be appreciated that various changes can be made therein without departing from the spirit and scope of the disclosure. In that regard, the detailed description set forth below, in connection with the appended drawings is intended only as a description of various examples of the disclosed subject matter and is not intended to represent the only examples. Each example described in this disclosure is provided merely as an example or illustration and should not be construed as preferred or advantageous over other examples. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

One example of virtual objects that may be used for the authoring of scenario cases, in particular of training scenarios, are shown in FIG. 1a. With the help of this virtual objects 1 could setting up of training scenarios be eased as the same could be placed in the augmented reality environment directly itself instead of programming the same in advanced. Examples of such virtual objects may be an info object 3, a warning object 5, a "pick a part" object 7, a "pick a tool" object 9 or a "place a tool" object 11. Of course, several other objects are possible and can be used within the method according to the present disclosure.

In FIG. 1b is a three-dimensional view of one embodiment 20 of the present disclosure shown. As can be seen in said FIG. 1b, the user may assign virtual objects to specified work areas 22, 24 and 26. The first work area 22 is defined as a storage area in which physical objects are stored. The first virtual object 28 informs the user to "pic" the object and "take" the same to the next work area. The subsequent work area 24 is a tool location where several different tools are stored. The second virtual object 30 informs the user which tool he should "pic" and take to the third work area 26. Within said work area 26 the third virtual object 30 informs the user how to mount the object taken from the first work area 22 with the tool taken from the second work are 24 to the object location in the third work area 30.

To set up such a training scenario the user may just place the virtual objects at the right locations and the next users are these information shown in the same order as work instructions.

This makes it possible for everyone to set up scenario cases, even without any programming skills.

To do so, it is according to one embodiment of the present disclosure possible that a user assigns virtual objects to physical objects by physical actions. The set of virtual objects may comprise functional elements, in particular visualizations and/or symbols for physical actions, preferably visualizations and/or symbols for take, use, place and/or store a physical object, assembly positions, assembly pathways, different types of warnings, tools to be used, general information, preferably a turning moment, inspection tasks and/or how to click a clip.

To link said virtual objects to real physical objects makes it quite simple to create a training scenario. The user is enable by the method according to the present disclosure to make a physical movement to assign for example a "take" symbol to a certain tool. Afterwards, the "use" symbol is placed above, next to or directly at the physical object the grabbed tool should be used. Such steps could easily be completed by instructions and warnings as well as general information which all can be linked with physical objects just by a physical movement of the user only.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising:
    establishing, using at least one computing device, an augmented reality environment;
    wherein the augmented reality environment is comprised of a real space in which a user is physically located;
    wherein the augmented reality environment comprises a set of virtual objects projected into the real space assignable to physical objects by the user;
    sensing, by at least one sensor, a particular physical action of the user in the real space in which the user is physically located representative for the assignment of the virtual object to the physical object;
    in response to sensing the particular physical action in the real space in which the user is physically located, updating, by at least one application executing on the at least one computing device, a set of one or more properties of a list linking the physical and the virtual objects based on the particular physical action sensed by the at least one sensor, and wherein updating the set of one or more properties of the list linking the physical and the virtual objects based on the particular physical action sensed by the at least one sensor causes a subsequent user to see in the established augmented reality the virtual objects assigned by the user to the physical objects;
    wherein the list linking the physical and the virtual objects based on the particular physical action is generated in the order the physical actions are performed by the user and shown in said order determined by the first user to the subsequent users.

2. The method according to claim 1, wherein the subsequent user interacts with the augmented reality environment after having assigned at least one of one virtual object to the physical object comprising the updated list and a new user not identical with the first user.

3. The method according to claim 1, wherein updating the set of one or more properties of the list linking the physical and the virtual objects based on the particular physical action sensed by the at least one sensor causes the comparing of the sensed physical actions of a subsequent user with the predetermined actions to be done by the subsequent user defined by the assigned virtual objects to the physical objects by the first user, wherein similarities and differences of the physical actions of the subsequent user to the defined actions by the first user are sensed by the at least one sensor and compared by the at least one computing device, wherein in particular the sensor is configured and adapted to detect at least one body movement comprising hand movements, viewing at positions, eyetracking of the subsequent user and/or the use of interaction devices, in particular the use of a joystick or a controller by the subsequent user, wherein in particular a user-worn or subsequent user-worn apparatus comprise of one or more video sensors and a LIDAR system as a sensor, an Inertial Measurement Unit (IMU) as a sesnor, a Global Positioning System (GPS) sensor, a computer processor, and a see-through MID (Head mounted display) and eyewear as the sensor.

4. The method according to claim 3, wherein, a level of detailing of the virtual objects assigned to the physical objects shown to a subsequent user depends on a level of experience of the subsequent user, determined by the monitored similarities and differences of executed actions and predetermined actions defined by the assigned virtual objects, wherein in case of more differences the level of detailing becomes higher and in case of more similarities the level of detailing becomes lower.

5. The method according to claim 1, wherein the set of virtual objects comprises functional elements in the form of one or more of visualizations and symbols for physical actions, wherein the functional elements are for at least one of take, use, place and store a physical object, assembly positions, assembly pathways, different types of warnings, tools to be used, general information, in the form of one or more of a turning moment, inspection tasks and how to click a clip.

6. The method according to claim 1, wherein the particular physical action by the at least one user is comprised of at least of one body movement, direct input of data into the at least one computer device, and at least one vocalization.

7. The method according to claim 1, wherein at least one body movement comprises at least one of hand movements, viewing at positions, eyetracking and the use of interaction devices in the form of at least one of a joystick and a controller.

8. The method according to claim 1, wherein the particular physical actions comprises a predefined component to be executed by the user to indicate the computing device establishing the augmented reality to assign a virtual object to a physical object.

9. The method according to claim 1, wherein the particular physical actions to assign a virtual object to a physical object is determined by the at least one computing device automatically and no predefined movement of the user is needed, wherein the assignment of the virtual to the physical object is determined by the at least one computing device by at least one of machine learning and artificial intelligence.

10. The method according to claim 1, wherein the user views the augmented reality environment by wearing at least one apparatus that projects virtual objects into the real space in which the user is physically located; wherein the at least one apparatus includes the at least one sensor, at least one display through which projections of the virtual objects are viewed, and at least one processor.

11. The method according to claim 10, wherein the at least one apparatus worn by the user allows for binocular vision to immerse the user within the augmented reality environment.

12. The method according to claim 1, wherein the at least one sensor includes at least one of a digital video camera, an electromagnetic sensor, an accelerometer, or a gravimeter.

13. The method according to claim 1, wherein each virtual object can be assigned to an individual work area having local coordinate space, wherein each individual work area is assigned with a trackable marker, wherein the trackable marker allows the computing devices to identify each individual work area independent from their actual location in the real space by updating the local coordinate space accordingly.

14. The method according to claim 13, wherein the marker is a data tag in the form of a visual target that has at least one of a two dimensional or three dimensional barcode, a NFC-Tag, a RFID-Tag, and the marker is an unique identifiable physical object sensed by the at least one data unit and linked with the virtual object in the list of objects.

* * * * *